United States Patent

[11] 3,617,140

[72] Inventor Richard L. Gates
 Bethel Park, Pa.
[21] Appl. No. 837,412
[22] Filed May 30, 1969
[45] Patented Nov. 2, 1971
[73] Assignee Koppers Company, Inc.

[54] METHOD AND APPARATUS FOR PIERCING A POLE TO ACCOMMODATE HARDWARE-MOLDING FASTENERS
 11 Claims, 8 Drawing Figs.
[52] U.S. Cl. ..................................................... 408/1,
 408/90, 408/91, 408/115
[51] Int. Cl. ....................................................... B23b 49/02
[50] Field of Search ............................................ 77/62, 62
 W, 13; 144/93, 112; 33/189

[56] References Cited
UNITED STATES PATENTS

| | | | |
|---|---|---|---|
| 522,654 | 7/1894 | Crawford ..................... | 77/40 |
| 532,841 | 1/1895 | Trafton ........................ | 77/13 |
| 596,375 | 12/1897 | Murchie ....................... | 77/13 |
| 1,598,216 | 8/1926 | Morgan et al. ................ | 77/62 W |

Primary Examiner—Francis S. Husar
Attorneys—Sherman H. Barber and Olin E. Williams ABSTRACT: A method and apparatus for piercing poles including a perforated template used to locate the centers of the mounting holes; an auger-guiding jig that is positionable on the pole and is alignable with the hole markings includes adjustable auger-guiding blocks which are releasably securable to the jig so as to align with an axis connecting hole markings on opposite sides of the pole.

PATENTED NOV 2 1971 3,617,140

INVENTOR.
RICHARD L. GATES

BY Sherman H. Barber
Attorney

INVENTOR.
RICHARD L. GATES

METHOD AND APPARATUS FOR PIERCING A POLE TO ACCOMMODATE HARDWARE-MOLDING FASTENERS

BACKGROUND OF THE INVENTION

In transmitting electrical power over long distances by overhead wires and cables, it is customary to support the wires and cables upon poles set in the ground at spaced-apart intervals. Such poles are generally produced from tall straight trees, and to each pole, there is usually fastened one or more individual utility arms or one or more pairs of utility arms. Each arm supports an insulator and the wire or cable coacts with the insulator.

In some instances, round metallic poles are used and these present no problem in mounting the utility arms. But, because trees are not conical in shape and are not circular in cross section, it has, heretofore, been particularly difficult to mount a pair of utility arms in a way that is both functionally useful and aesthetically pleasing. One principal difficulty is to so drill holes through the wooden pole that the utility arms on the opposite sides of the pole lie in the vertical axial plane of the pole and that all the utility arms lie in the same plane.

Heretofore, there has been no known apparatus and method for piercing wooden tree poles that insures the arrangement of all utility arms in the same vertical axial plane. Those skilled in the art will understand from the following description how effectively the apparatus and method of the invention accomplishes the drilling of mounting holes so that the utility arms lie in a single vertical plane.

SUMMARY OF THE INVENTION

The apparatus of the invention comprises means for marking the surface of a pole to be drilled to mount hardware thereto and means for drilling a pilot hole through the pole. The main body portion of the apparatus is releasably secured to the pole with a pilot pin inserted through the pilot hole in the pole and through a hole in the main body portion. A pair of mounting pads secured to the main body portion have in each one an elongate slot that is registrable with the markings on the pole. Hole-making tool guiding means are mounted to the pads and are adjustable each to align with a hole axis passing through markings on opposite sides of the pole.

For a further understanding of the invention and for features and advantages thereof, reference may be made to the following description in conjunction with the drawings which illustrate one embodiment of the invention.

BRIEF DESCRIPTION OF THE DRAWINGS

One embodiment of apparatus that is in accordance with the invention and that is suitable to practice the method of the invention, is illustrated in the drawing, wherein.

DETAILED DESCRIPTION

Figure 1:
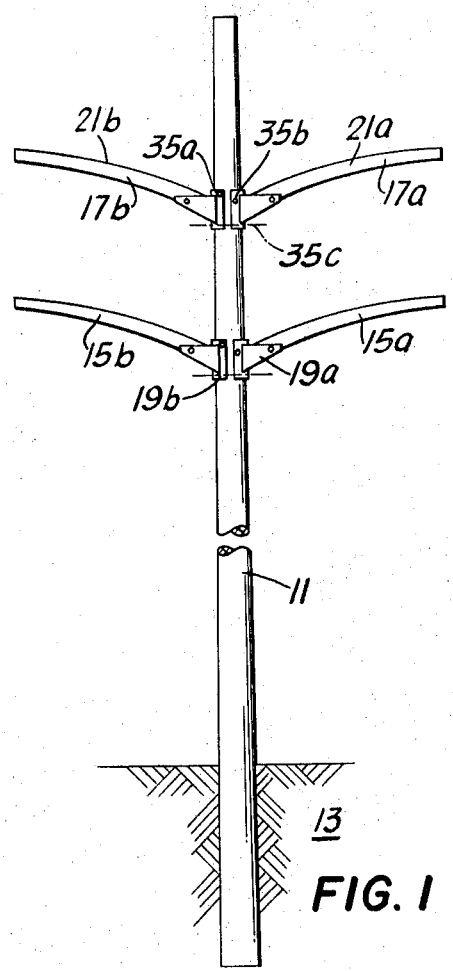
FIG. 1 is a schematic elevational view of utility arms mounted to a wooden pole drilled with apparatus in accordance with the invention.

FIG. 1 illustrates a typical wooden tapering (frustoconical) utility pole 11 that is set firmly in the ground 13 and that carries two pairs of upswept utility arms 15a, 15b, and 17a, 17b. The arms 15a, 15b and 17a, 17b comprise pairs of metallic bracket portions 19a, 19b and arm portions 21a, 21b that are made preferably of laminated treated wood. Of course, other types of materials than treated wood may be used for the arms, if preferred.

Figure 2:
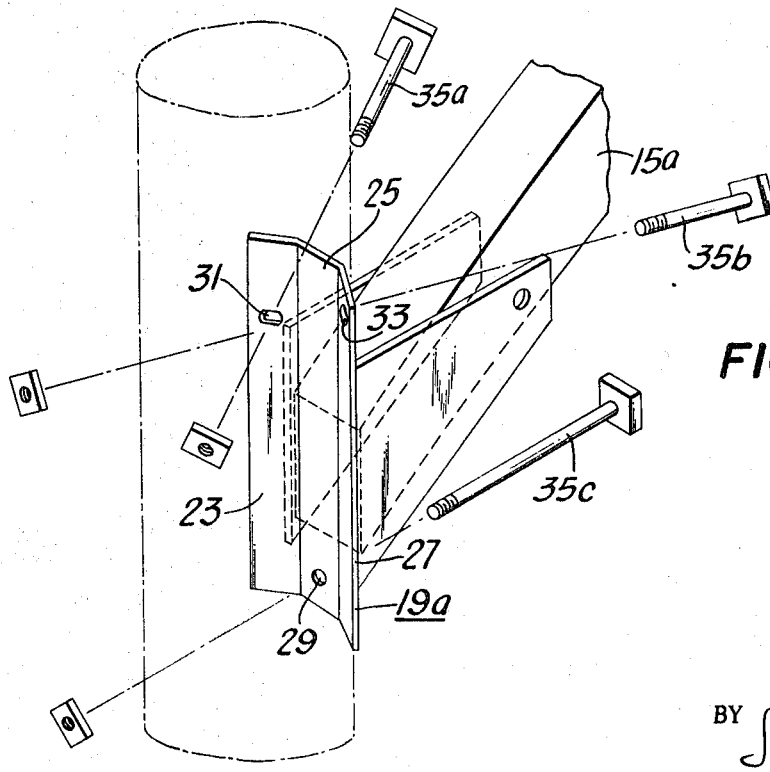
FIG. 2 is a schematic exploded view of a mounting bracket for mounting to a pole.

Each metallic bracket portion 19a, 19b is dished about as shown in FIG. 2 and has three flat intersecting surfaces 23, 25, 27. Surfaces 23, 27 are adapted to contact the surface of the utility pole 11 as tangent planes, and the surface 25 may or may not contact the surface as a tangent plane depending upon the diameter of the pole and the shape of the cross section of the pole.

The surface 25 has a single hole 29 near the bottom of the metallic bracket structure; the hole 29 being on the vertical central axis of the planar surface 25. Each of the surfaces 23, 27 has a single hole 31, 33 respectively located near the top of the surface. The holes 31, 33 are on the vertical central axis of their planar surfaces 23, 25, but the hole 31 is located some selected distance above the hole 33, for a reason that will be apparent hereinafter.

The vertical distances between holes 29, 31 and 29, 33 are fixed for any particular metallic bracket portion, and it is only necessary to drill holes through the pole 11 to attach pairs of brackets 19a, 19b to the pole by means of through bolts 35a, 35b, 35c.

Since the bolts 35a and 35b extend through the pole 11, it is evident that bolthole 31 must be at a higher (or lower) level above the central hole 29 than the bolthole 33; otherwise, it would not be possible to pass both bolts 35a, 35b through the pole 11 at the same level.

Those skilled in the art will know how difficult it has been heretofore to drill mounting holes through wooden utility poles so that matching pairs of upswept arms 15a, 15b and 17a, 17b lie in the same vertical plane containing the vertical axis of the pole 11.

The apparatus herein described and illustrated in the drawings is easily attached to a utility pole. After the apparatus is located in the manner described herein, one can quickly drill the mounting holes and know that they will be properly placed to achieve the desired coplanar mounting of the upswept utility arms.

Figure 3:
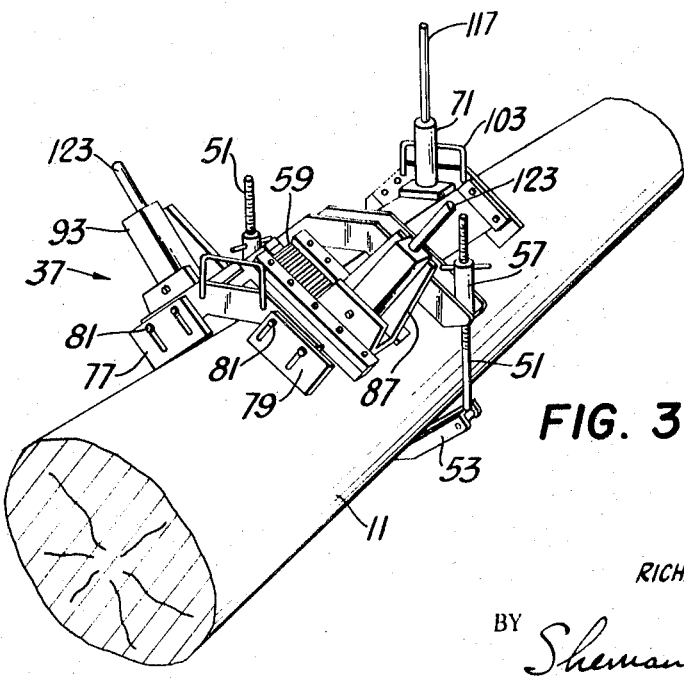
FIG. 3 is a schematic perspective view of the apparatus of the invention, shown in operative position on a pole.

FIG. 3 illustrates, in a schematic perspective manner, apparatus 37 for guiding an auger or other tool used to make holes in the utility pole 11.

The apparatus 37, which may be characterized as a drilling template or jig, includes an elongated dished main body portion 39 (FIG. 4) which is comprised of three intersecting flat planar members 41, 43, 45. About midway between the ends of the main body portion 39, there is fixably attached thereto a channel shaped upper clamping member 47, which provided with open slots 49 in the extremities to receive clamping bolts 51 mentioned hereinafter.

Figure 6:
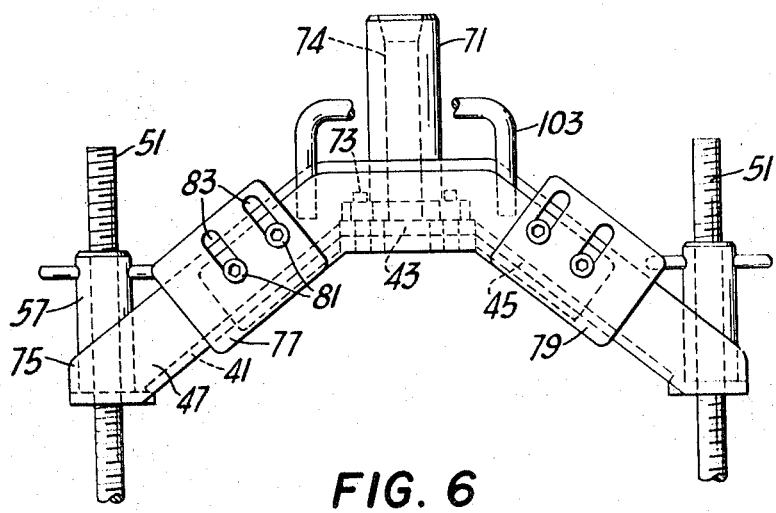
FIG. 6 is a view along line VI—VI of FIG. 4.

A channel-shaped lower clamping member or band 53 is also shaped similar to the upper member 47, but the lower clamping member or band 53, being separate from and not attached to the main body portion 39, carries at its extremities, by means of pivot pins 55, clamping bolts 51. The clamping bolts 51 are threaded to cooperate with clamping nuts 57, shown in FIG. 6.

Figure 4:
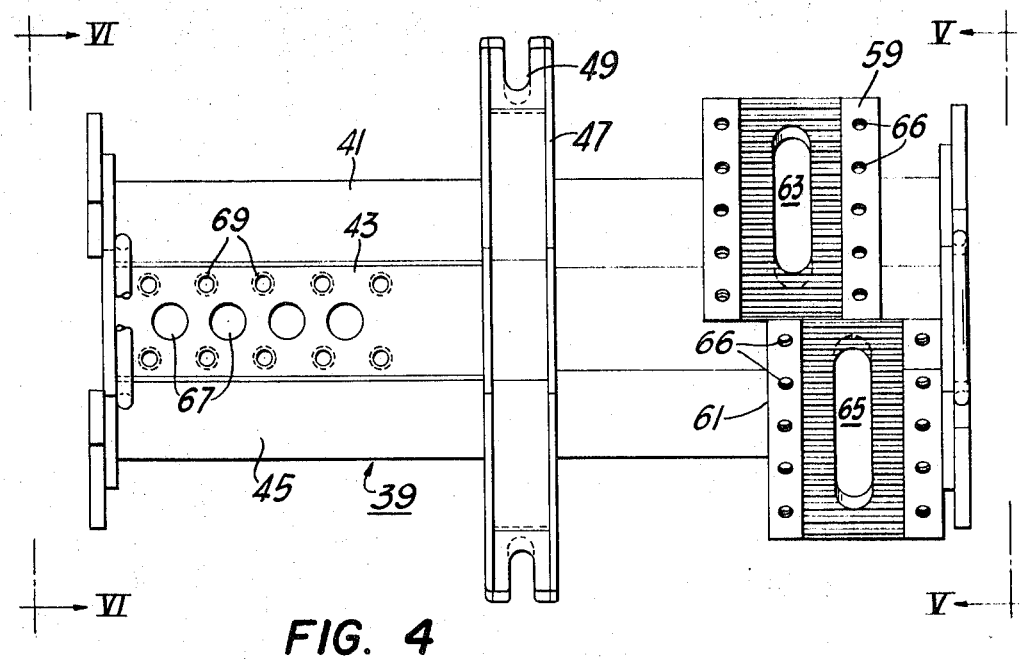
FIG. 4 is a simplified plan view of the apparatus of FIG. 3.

Adjacent the right-hand end of the main body portion 39, as viewed in FIG. 4, there are two serrated supporting pads 59, 61, each supporting pad 59, 61 has an oval elongate hole 63, 65 respectively through it and through the respective planar members 41, 45. The supporting pad 59, it will be noticed, is located farther away from the right-hand end of the main body portion than is the supporting pad 61. Thus, the slots 63, 65 are spaced apart, as shown in FIG. 4 and the distance between slots 63 and 65 is equal to the vertical distance between holes 31 and 33 of FIG. 2. Each supporting pad 59, 61 has a pair of parallel rows of tapped holes 66 to receive Allen screws or capscrews for a purpose that will be presently explained.

Adjacent the left-hand end of the main body portion 39, as viewed in FIG. 4, there are a plurality of holes 67 in the planar member 43, and the holes 67 are located a preselected distance apart along the longitudinal axis of the planar member 43. A row of tapped other holes 69 is located on each side of the row of central holes 67 for securing a pilot pin guide block 71 by means of cap screws 73, or the like. The guide block 71 has a central axial hole 74 through it.

Each one of the ends of the main body portion 39 carries an upstanding flange portion 75 to which is mounted a pair of leveling plates 77, 79 by means of Allen bolts 81 and self-locking nuts, or the like. Each plate 77, 79 has a pair of elongate holes 83 for a purpose that will be apparent from the description hereinafter.

Each serrated supporting member 59, 61 coacts with the serrated base portion 85 of a drilling guide support 87. The serrated base portions 85 have holes 89 therethrough to receive capscrews or Allen screws 91, that cooperate with the holes 66 in the serrated supporting pads 59, 61. Thus, the drilling guide support 87 may be releasably fixed to the supporting pads 59, 61 in preselected locations.

Figure 5:
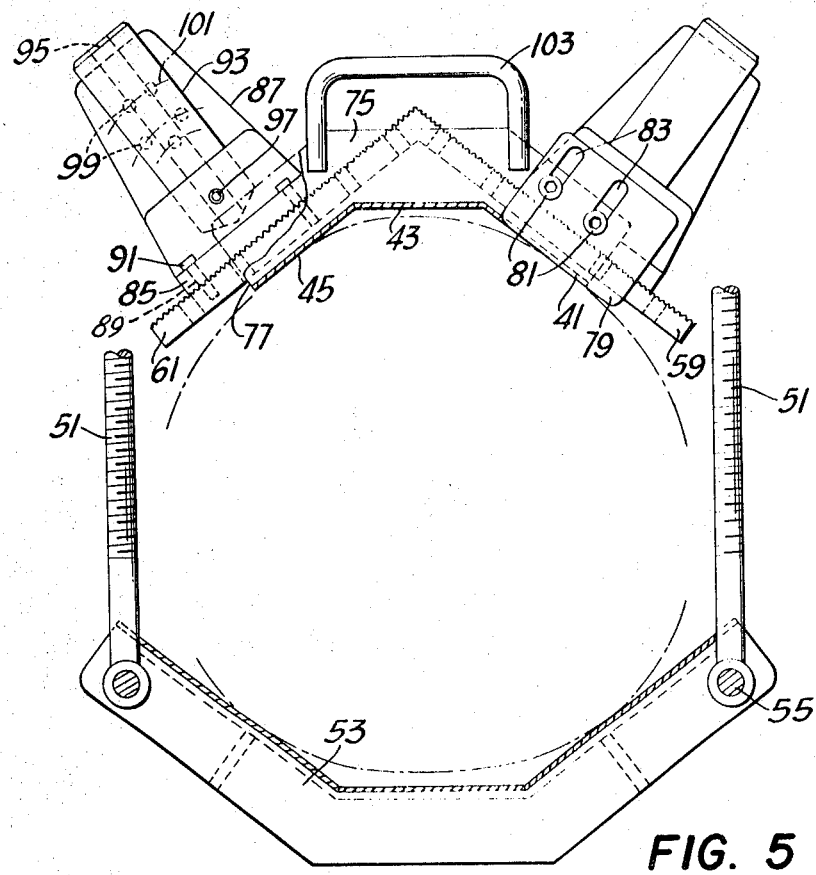
FIG. 5 is a view along line V—V of FIG. 4.

A drilling guide block 93, which has a central axial hole 95 through it, is pivotally mounted to the drilling guide support 87 by means of a pivot pin 97. The drilling guide support vertical portion has a plurality of holes 99 through it, that are arranged about as shown in FIG. 5. These holes are arranged on circular arcs 101 of increasing radii centered on the pivot pin 97, and an Allen set screw in a selected hole coacts with the drilling guide block 93 to secure it in position relative to the drilling guide support 87. That is to say, the axial hole 95 in the drilling guide block 93 is not necessarily aligned with the axis of the drilling guide support 87, but may be made to align with the axis of the mounting hole to be drilled through the pole 11.

U-shaped handles 103 are attached to the end flanges 75 for manual use in handling the apparatus 37.

The apparatus 37 is used in the following manner to locate the drilling guide blocks 93 so that when an auger or other hole-making tool is inserted into the axial holes 95 in the drilling guide blocks 93, the auger or tool will make a hole through the wooden utility pole 11 that is properly located to mount a pair of upswept utility arms 15a, 15b or 17a, 17b.

Initially, the utility pole 11 is placed in a horizontal position and it may be so placed that it can be rotated upon its longitudinal axis. Then, by careful measurement, the holes 29 are located along the surface of the pole at the desired locations; these holes being in a plane containing the longitudinal axis of the utility pole. When so located and bored through the utility pole, these holes 29 serve as pilot holes for locating properly the apparatus of the invention.

Figure 7:
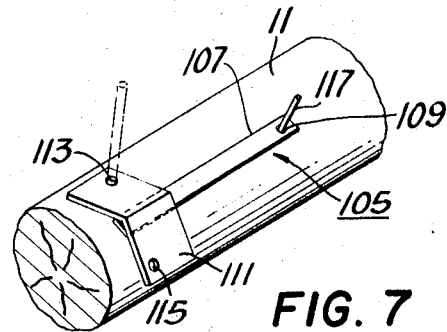
FIG. 7 is a schematic view of a first jig used to mark the location of mounting holes to be made in the pole.

FIG. 7 illustrates a template or jig 105 used to locate the other holes 31, 33. The template or jig 105 comprises an elongate flat member 107 in which there is a hole 109 at one end and to the other end of which there is attached a V-shaped plate member 111. The V-shaped member has two holes 113, 115 in it; the hole 113 being in one side and the hole 115 being in the other side portion. The hole 113 bears the same positional relation to hole 109 that hole 31 bears to hole 29 in the mounting bracket of FIG. 2.

Now, then, the template 105 is placed on the utility pole 11 and a guide pin 117 is inserted through the hole 109 and into one of the previously bored axial pilot holes 29 in the utility pole 11. Thereafter, by means of any suitable tool inserted into the holes 113 and 115 impressions 119a, 119b are made in one surface of the pole.

Those skilled in the art will recognize that the apparatus 37 may be used in the same manner; it is only necessary to know the location of the holes 31, 33 and to make markings 119a, 119b in the surface of the pole through the elongate holes 63, 65.

After the marking impressions 119a, 119b are made in the upper surface of utility pole 111, the template 105 is removed and the utility pole is rotated through an angle of 180°. The template 105 or apparatus 37 is again placed on the utility pole in the manner previously described, and impressions 121a, 121b are made in the surface of the utility pole 11. The impressions 119a, 121b and 119b, 121a lie on the axis of the mounting holes to be made in the pole 11.

Then, the template 105 and guide pin 117 are removed from the pole 11, and the apparatus 37 is brought into position. The guide pin 117 is inserted into the hole 74 in the pilot guide block 71 and the pin extends through or part way through the pole 11.

The pilot guide block 71 is previously mounted to the main body portion 39 so that the spacing between holes 67 and the slots 63, 65 correspond exactly to the spacing between holes 29 and 31, 33 of the mounting bracket of FIG. 2. Those skilled in the art will recognize that, because of the plurality of holes 65, the apparatus 37 may be used to guide an auger to drill holes in the utility pole that are not exactly as shown in the mounting brackets 19a, 19b.

The apparatus 37 is then leveled by means of the leveling plates 77, 79. It is understood that the utility pole 11 is generally frustoconical in shape, but it does not necessarily have a circular cross section. So, it is therefore necessary, to raise and level the apparatus 37 before drilling the mounting holes through it. Once the apparatus is put in a level position, the leveling plates 77, 79 are secured in contact with the surface of the utility pole by tightening the Allen bolts 81. The term "level" is used herein to mean that the apparatus 37 is disposed parallel to the longitudinal axis of the pole which is assumed to be horizontal in the foregoing and following description.

In order to secure the apparatus 37 in position, the lower clamping member 53 is positioned in contact with the lower surface of the pole 11 and the clamping bolts 51 are brought into engagement with the open-ended slots 49. Thereupon, the clamping nuts 57 are tightened to secure the apparatus 37 in position.

Next, the hole-making tool guide supports 87 are positioned approximately so that the holes 95 in the guide blocks 93 are in registration with the impressions 121a, 121b. Thereafter, the guide support 87 may be secured to the supporting pads 59, 61 by the Allen screws 91, or other suitable fasteners.

Into each hole 95, there is inserted a pin 123 having a pointed end that coacts with the markings 121a, 121b and these pins 123 are long enough to project some distance above the top of the guide blocks 93, as shown in FIG. 3.

Figure 8:
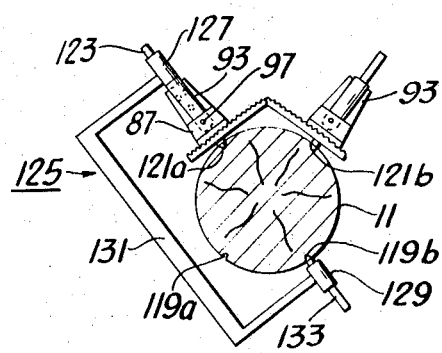
FIG. 8 is a schematic view of a second jig used to properly align a portion of the apparatus of FIG. 4.

FIG. 8 illustrates the use of another template or jig 125 which properly aligns the holes 95 in the guide blocks 93, with the axis of the mounting holes that connect markings 121a, 119b and 121b, 119a. The jig 125 comprises a pair of axially aligned bosses 127, 129 that are maintained in spaced-apart, fixed, axial position by a U-shaped rigid member 131 that may have an angular shape as shown in FIG. 8, or an arcuate shape, or any other shape as desired.

The boss 127 coacts with the guide pin 123 on the left, and the boss 129 accommodates another guide pin 133 which registers with the impression or the marking 119b.

Now, then, the guide block 93 may be pivoted about pin 97 until the pins 123, 133 are in registration with their respective markings 121a, and 119b, and until pins 123, 133 are in-axial alignment. If necessary, the tool guide support 87 may be relocated and fixed again, as mentioned previously.

In like manner, the guide block on the other supporting pad (the right-hand guide block 93 as viewed in FIG. 8) may be properly located in the same manner.

Then, the jig 125 is removed, as are the guide pins 123, 133 and the pole 11 is ready for drilling.

An auger, or other suitable hole-making tool, may be inserted into the hole 95 in each guide block 93 to make a hole through the pole. The auger will start at marking 121a, and exit at marking 119b. This is so, because the axes of the holes 95 are coincident with the axes of the bosses 127, 129, and with the hole axes connecting the markings 121a, 119b, and 121b, 119a.

After the two mounting holes 31, 33 have been made in the pole 11, the apparatus is relocated to drill another pair of holes to mount the upswept arms 17a, 17b. The same steps described herein will result in a proper location of the mounting holes so that the arms 17a, 17b and 15a, 15b lie in a common vertical plane containing the vertical axis of the pole.

Those skilled in the art will recognize many significant features and advantages of the invention described herein among which are:

That the apparatus is both simple to operate and effective in use to drill properly aligned holes in frustoconical wooden utility poles that are not necessarily circular in cross section;

That the apparatus can be quickly attached, adjusted, and removed from a pole without unnecessary delay; and That the apparatus and method of use permits the accurate drilling of hardware-mounting holes in a wooden utility pole not requiring any additional reaming or other drilling work to be done to align the holes.

What is claimed is:

1. Apparatus for guiding a tool for making hardware-mounting holes through a pole, the cross section of which is not necessarily circular, having one or more pilot-mounting holes therethrough and having surface markings that are on the axes of said mounting holes, comprising:
   a. a main body portion adapted to coact with the surface of said pole and having a first hole therethrough that is registrable with one of said pilot-mounting holes;
   b. a mounting pad secured to said main body portion and having a second hole therethrough which is registrable with one of said surface markings and with one of said hole axes;
   c. means adapted to secure said main body portion to said pole;
   d. tool-guiding means adjustably mounted to said mounting pad;
   e. means to locate said tool-guiding means in operative relation to said second hole and said one axis;
   f. means to align said tool-guiding means with said one axis; and
   g. means to secure said tool-guiding means in such aligned position.

2. The invention of claim 1 including:
   a. another mounting pad secured to said main body portion and having a third hole therethrough which is registrable with a second surface marking and with a second one of said axes;
   b. tool-guiding means adjustably mounted to said other mounting pad;
   c. means to locate said other tool-guiding means in operative relation to said third hole and said other axis;
   d. means to align said other guiding means with said other axis; and
   e. means to secure said other tool guiding means in such aligned position.

3. The invention of claim 1 wherein:
   a. said means to align said tool-guiding means includes:
      i. means adapted to locate said main body portion in parallel relation to the longitudinal axis of said pole.

4. The invention of claim 3, wherein:
   a. said means adapted to locate said main body portion includes:
      i. leveling plates adapted to coact with said pole, and
      ii. means for securing said plates to said main body portion.

5. The invention of claim 1 wherein:
   a. said means for securing said main body portion includes:
      i. a band adapted to partially surround said pole, and
      ii. releasable means connecting said band to said main body portion.

6. The invention of claim 5 wherein:
   a. said releasable means include:
      i. a bolt pivotally connected to said band, and
      ii. a nut threaded on said bolt that coacts with said main body portion.

7. The invention of claim 1 wherein:
   a. said tool guiding means includes:
      i. a block having an axial hole therethrough that is pivotally mounted to one of said pads, and;
      ii. means to secure said block in a selected position relative to said pad so that said hole is aligned with a mounting hole axis connecting a pair of surface markings on opposite side of said pole.

8. The method of making hardware-mounting holes through a pole having a cross section that is not necessarily circular, comprising the steps of:
   a. making surface marks on opposite sides of said pole where said holes are to be made therethrough, said holes being not in the same vertical axial plane of said pole;
   b. placing on said pole means for guiding a hole-making tool with said guiding means being in registration with one of said surface marks;
   c. temporarily securing said guiding means to said pole;
   d. aligning said guiding means with a line connecting a pair of surface marks on opposite sides of said pole that lie on an axis of a mounting hole;
   e. inserting a hole-making tool in said guiding means, and;
   f. making a hole through said pole.

9. The invention of claim 8 including the step of:
   a. arranging said tool-guiding means on said pole so that said guiding means is substantially normal to the longitudinal axis of said pole.

10. The invention of claim 8 including the steps of:
    a. placing on said pole a second means for guiding a hole-making tool with said second means being in registration with another one of said surface marks on the same side of said pole as said one of said surface marks;
    b. aligning said second means with a line connecting another pair of surface marks on opposite sides of said pole that lie on an axis of another mounting hole; and
    c. inserting a hole-making tool in said second guiding means; and
    d. making a second hole through said pole.

11. The method of making hardware-mounting holes through a pole having a cross section that is not necessarily circular, comprising the steps of:
    a. making a pilot-mounting hole through said pole;
    b. placing a perforated first jig on said pole so that one perforation is in registration with said pilot mounting hole;
    c. marking the surface of said pole where said mounting holes are to be located through other perforations in said first jig;
    d. removing said perforated first jig from said pole; and
    e. placing a perforated hole-making, tool-guiding second jig on the one side of said pole so that one perforation is in registration with said pilot-mounting hole and other perforations are in registration with said hole surface markings;
    f. temporarily securing said second jig to said pole;
    g. arranging said second jig so that its axis is substantially parallel to the longitudinal axis of said pole;
    h. placing said perforated first jig on the opposite side of said pole from said second jig in such a way that said one perforation in said first jig is in registration with said pilot hole;
    i. marking the opposite surface on said pole where the mounting holes are to be located therethrough using other perforations in said first jig;
    j. removing said first jig from said first pole surface;
    k. aligning a first hole-making tool guide with a line connecting surface marks on the opposite sides of said pole that lie on the axis of mounting hole;
    l. aligning a second hole-making tool guide with another line connecting other surface marks on opposite sides of said pole that lie on the axis of another mounting hole;
    m. making holes in said pole through said first and said second tool guides; and
    n. removing said second jig from said pole.

\* \* \* \* \*